Patented Nov. 29, 1927.

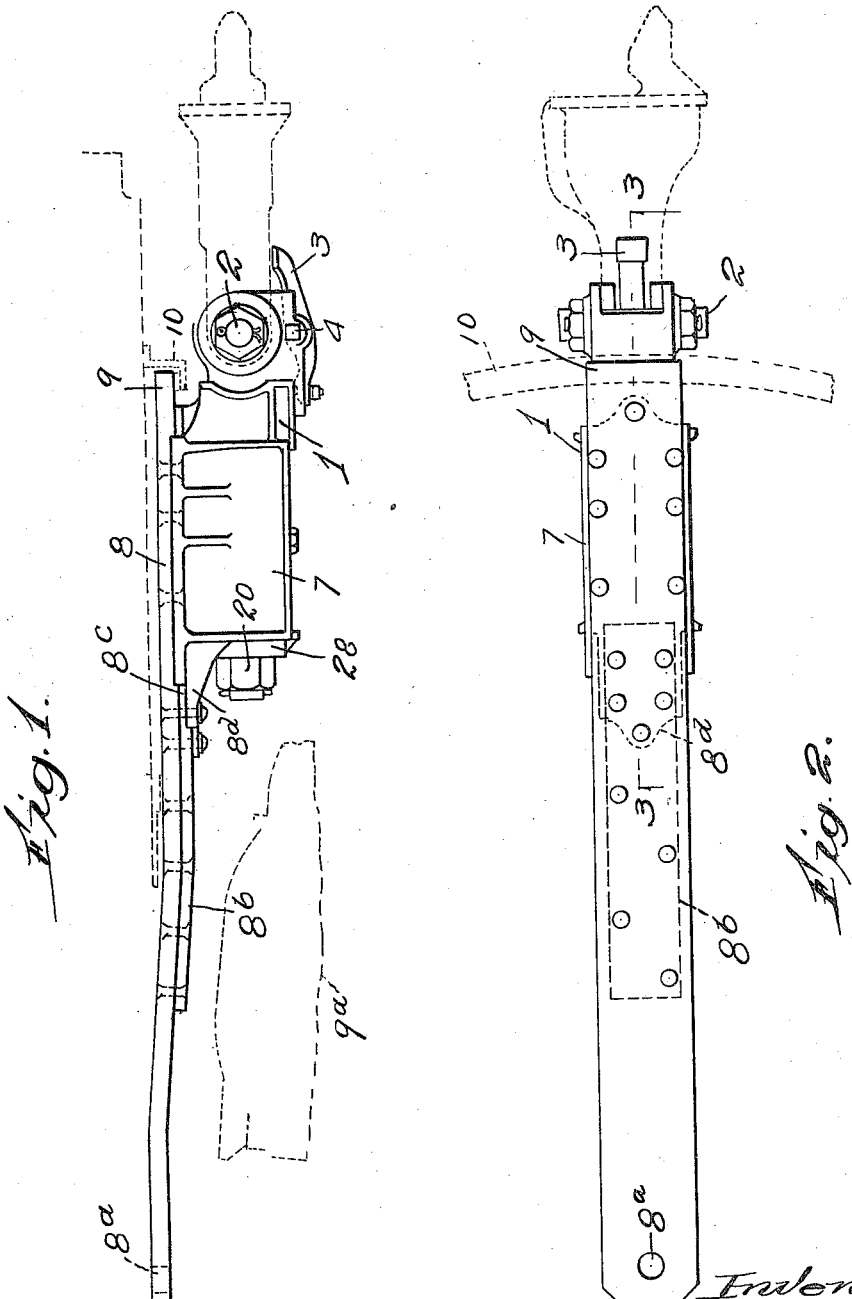

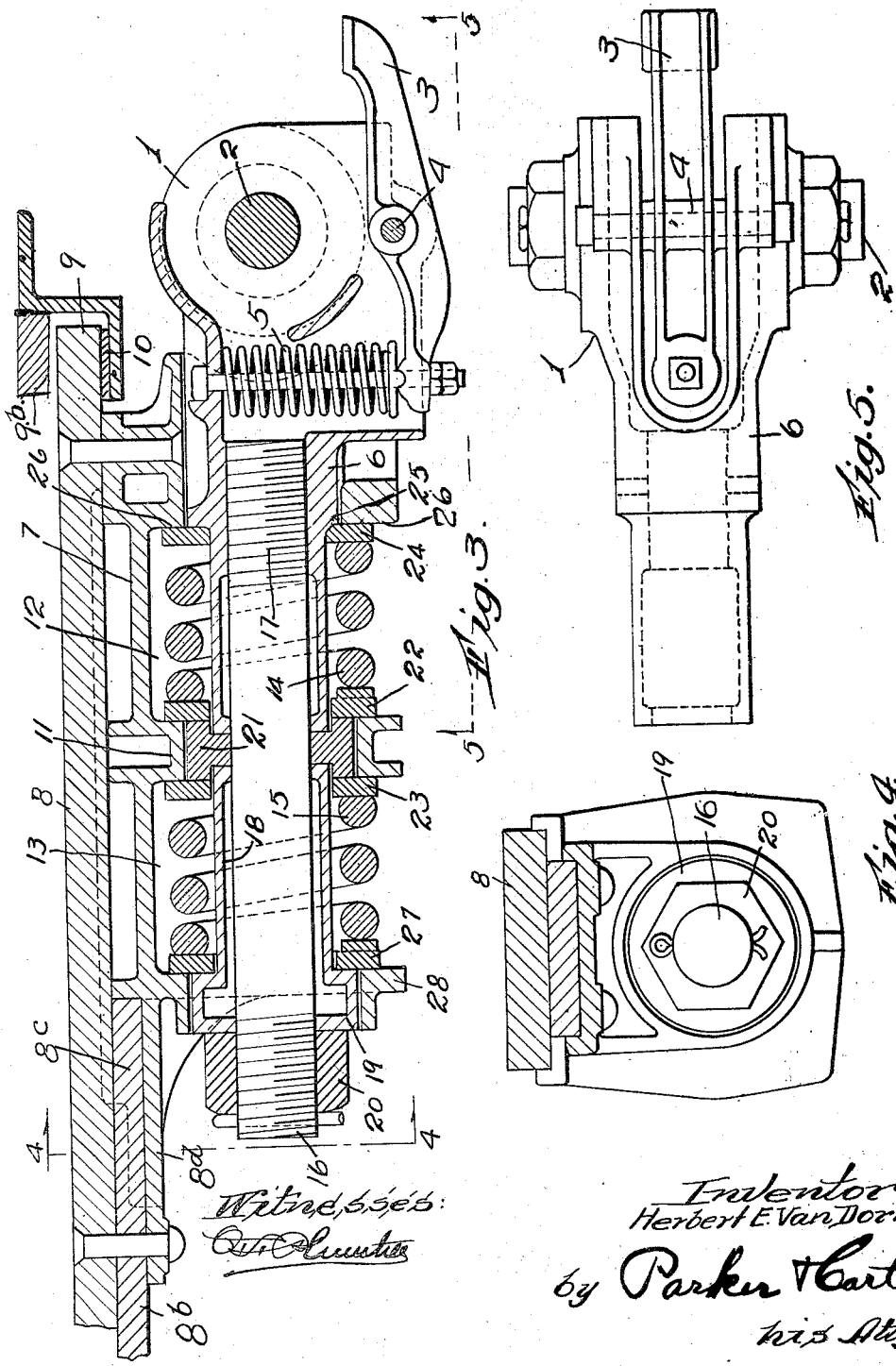

1,650,670

UNITED STATES PATENT OFFICE.

HERBERT E. VAN DORN, OF CHICAGO, ILLINOIS.

DRAFT GEAR.

Application filed October 17, 1917, Serial No. 197,062. Renewed April 14, 1926.

This invention relates to draft gears for car couplers and has for its object to provide a new and improved device of this description to be connected to the car coupler and to absorb the shocks imparted to the car coupler in coupling cars together, and in the operation of the train.

The invention is illustrated in the accompanying drawings, wherein—

Figure 1 is a side view of a draft gear embodying the invention;

Figure 2 is a plan view of the device shown in Fig. 1;

Figure 3 is a sectional view taken on line 3—3 of Fig. 2;

Figure 4 is a sectional view taken on line 4—4 of Fig. 3;

Figure 5 is a view taken on line 5—5 of Fig. 3.

Like numerals refer to like parts throughout the several figures.

In the construction shown, I provide a head 1, provided with a pivot 2, upon which a coupler head is adapted to be pivoted. The head has a yielding support 3 for the coupler head, pivoted at 4 and engaging the spring 5 connected with the head. The shank 6 projects into a housing 7 which is connected with a supporting piece 8 having a projecting end 9 which slides upon a support 10 attached to the car. The housing 7 is provided with an inwardly projecting part 11 intermediate the ends thereof, this projecting part dividing the housing into two chambers 12 and 13, in which are received the springs 14 and 15, the spring 14 surrounding the shank 6. A bar 16 engages the shank 6, being preferably connected thereto by means of the screw threads 17, the end of the bar projecting into the shank which is hollow, as shown in Fig. 3. Surrounding the bar 16 is a hollow part 18 which is surrounded by the spring 15. This hollow part is provided with an enlarged end 19. The bar 16 is connected with this hollow part in any desired manner. As herein shown, the bar 16 is screw-threaded at the end and is provided with the nut 20, which holds the part 18 on the bar. The shank 6 and the hollow part 18 are separated by means of a washer 21, the washer being nominally opposite the inwardly projecting part 11. On opposite sides of the washer are the spring engaging parts 22 and 23, which are adapted to be engaged by the washer when it is moved, and which project beyond the washer and engage the inwardly projecting part 11, as shown in Fig. 3. The washer 22 engages the spring 14 at one end; a spring engaging part 24 engages said spring at the other end and is adapted to be engaged by a shoulder 25 on the shank 6 when the shank is moved inwardly. This spring engaging part also engages an inwardly projecting part 26 on the housing. The enlargement 19 on the part 18 is adapted to engage a spring engaging part 27, which engages the end of the spring 15. This spring engaging part 27 also engages the end piece 28 of the housing. It will thus be seen that the springs 14 and 15 are both simultaneously compressed when the head is moved in either direction. The supporting piece 9 extends rearwardly and is connected with the car by means of the pivot passing through the opening $8^a$ (see Figs. 1 and 2). A piece $8^b$ is fastened to the supporting piece 8 just back of the housing having a projection $8^c$ which overlaps a portion $8^d$ on the housing. This construction leaves a clear space for the motor at the rear of the housing and below the supporting piece $8^b$. A portion of the motor is shown in dotted lines at $9^a$, Fig. 1. This motor may be very close to the under side of the car as the bars 8 and $8^b$ take up very little room. It will therefore be seen that in coupling and in train operations any stress applied to the car coupler will be imparted to the springs in the housing 7 regardless of the position of the bar 8. The end 9 of the bar 8 may be prevented from moving upwardly by means of the projecting part $9^b$ extending rearwardly above it, as shown in Fig. 3. There is no side swing between the housing 7 and the coupler head, and the pivoting movement of the coupler head on the pin 2 does not produce any lost motion. The bar $8^b$ fastened to the bar 8 and housing 7 strengthens the bar 8 and prevents it from being bent when an extreme stress is applied to the housing. The distances between the coils of the springs 14 and 15 are such that if these springs are compressed between the spring engaging parts in the housing 7 the washer 21 will not pass entirely beyond the projection 11 and the enlargement 19 will not pass entirely beyond the housing, and the bearing surface of the shank will not pass beyond its opposed bearing face on the housing. This construction therefore makes it impossible for the springs to compress to such an amount as to reduce the amount of bearing surface so as to adversely affect the proper working of the apparatus. In operation, when the head is moved to the right (see Fig. 3), the washer 21 and the enlargement 19 engage the spring engaging parts 22 and 27 and move them to the right to compress both springs. The movements of the other ends of the springs are stopped by the spring engaging parts 23 and 24. When the head is moved to the left, the shoulder 25 engages the spring engaging part 24 so as to compress the spring 14, the other end of the spring being stopped by the spring engaging part 22 engaging the projection 11. The spring engaging part 23 is moved by the part 21 so as to compress the spring 15, the other end of the spring being held by spring engaging part 27 engaging the projection 28. It will be noted that the hollow shank 6 extends through the forward spring. It will further be seen that both springs are brought into play when the head is moved in either direction.

I have described in detail a particular construction embodying the invention, but it is of course evident that the parts may be varied in many particulars, and I therefore do not limit myself to the particular construction shown.

It will be noted that by means of this construction there is a wide vertical and lateral coupling and operating movement of the draft gear, and that during all of the various positions of the draft gear the shock is imparted to the springs and is absorbed thereby. The springs are independently compressed, that is, each receives a portion of the shock without transmitting it to the other, the springs therefor independently absorbing portions of the shock.

I claim:

1. A draft gear comprising a housing, a spring in said housing, means for connecting said spring with a car coupler, a support separate from said housing and connected therewith and with the car, a strengthening piece connected with said support near the inner end of the housing and also connecting with said housing, said support projecting in both directions beyond said strengthening piece.

2. A draft gear comprising a housing, a spring in said housing, means for connecting said spring with a car coupler, a support separate from said housing connected with said housing and adapted to be connected with the car, a strengthening piece connected with said support near the inner end of said housing and also connected with said housing, said strengthening piece strengthening said support and acting as an abutment for said housing.

In testimony whereof, I affix my signature this 6th day of October, 1917.

HERBERT E. VAN DORN.